US012567888B2

(12) United States Patent
Nasiri Khormuji et al.

(10) Patent No.: US 12,567,888 B2
(45) Date of Patent: Mar. 3, 2026

(54) DEVICES, METHODS AND COMPUTER PROGRAMS FOR TWO-PART FEEDBACK INFORMATION TRANSMISSION

(71) Applicant: HUAWEI TECHNOLOGIES CO., LTD., Shenzhen (CN)

(72) Inventors: Majid Nasiri Khormuji, Kista (SE); Yi Qin, Shanghai (CN); Kunpeng Liu, Beijing (CN); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/622,806

(22) Filed: Mar. 29, 2024

(65) Prior Publication Data

US 2024/0243785 A1 Jul. 18, 2024

Related U.S. Application Data

(63) Continuation of application No. PCT/CN2021/132836, filed on Nov. 24, 2021.

(51) Int. Cl.
| | |
|---|---|
| *H04L 23/02* | (2006.01) |
| *H04B 7/0456* | (2017.01) |
| *H04L 5/14* | (2006.01) |

(52) U.S. Cl.
CPC ......... *H04B 7/0456* (2013.01); *H04L 5/1469* (2013.01)

(58) Field of Classification Search
CPC ..... H04L 1/0003; H04L 1/0025; H04L 5/001; H04W 72/23; H04W 28/263; H04B 1/707; H04B 17/202; H04B 7/0456
(Continued)

(56) References Cited

U.S. PATENT DOCUMENTS

| | | |
|---|---|---|
| 2012/0231784 A1 | 9/2012 | Kazmi |
| 2014/0177747 A1 | 6/2014 | Ruiz Delgado et al. |

(Continued)

FOREIGN PATENT DOCUMENTS

WO 2021217489 A1 11/2021

OTHER PUBLICATIONS

"3rd Generation Partnership Project; Technical Specification Group Radio Access Network; Study on New Radio (NR) Access Technology Physical Layer Aspects (Release 14)," 3GPP TR 38.802 V1.0.0, total 64 pages, 3rd Generation Partnership Project, Valbonne, France (Nov. 2016).

(Continued)

*Primary Examiner* — Khai Tran
(74) *Attorney, Agent, or Firm* — Leydig, Voit & Mayer, Ltd.

(57) ABSTRACT

Devices, methods and computer readable medium for two-part feedback information transmission in wireless communications are provided. The two-part feedback information transmission is adopted, e.g., for improved downlink multiple-input and multiple-output (MIMO) precoding in time-division duplex (TDD)-based communication systems. The feedback information transmission allows compensating for adverse effects of incomplete UL-DL reciprocity for DL MIMO precoding caused by mismatched DL and UL channel measurements. The feedback information transmission being two-part allows low overhead for the feedback information.

20 Claims, 7 Drawing Sheets

(58) Field of Classification Search
USPC ........................................ 375/262, 260, 299
See application file for complete search history.

(56) References Cited

U.S. PATENT DOCUMENTS

| | | | | |
|---|---|---|---|---|
| 2017/0111901 A1* | 4/2017 | Chu | ...................... | H04W 72/21 |
| 2021/0203452 A1* | 7/2021 | Lin | ...................... | H04L 1/1819 |
| 2023/0057836 A1* | 2/2023 | Yeo | ...................... | H04L 1/0009 |
| 2023/0217433 A1* | 7/2023 | Liang | ............... | H04W 72/1263 |
| | | | | 370/329 |

OTHER PUBLICATIONS

CATT, "CSI feedback for NR MIMO," 3GPP TSG RAN WG1 Meeting #87, Reno, USA, R1-1611384, total 5 pages, 3rd Generation Partnership Project, Valbonne, France (Nov. 14-18, 2016).

\* cited by examiner

400A

400B

Static Quantization Range
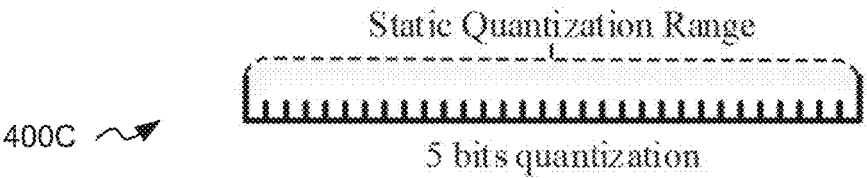
400C
5 bits quantization
Stage 1:
Reported range
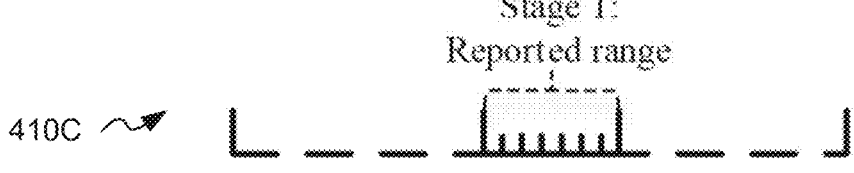
410C
Stage 2: 3 bits quantization
FIG. 4C
| Receive Stage 1 Feedback | Receive Stage 2 Feedback | Measure the mismatched UL Channel: H_UL |
|---|---|---|
501            502            503
Compute the Correlation Matrix According to
(19)
504
505    Perform SVD
(20)
506    Determine the Precoder
(21)                    ← Rank r
507    Precoder    ← Data/Pilot
Precoded Data/Pilot
500
FIG. 5

Average Physical Layer Overhead (bits/40ms)

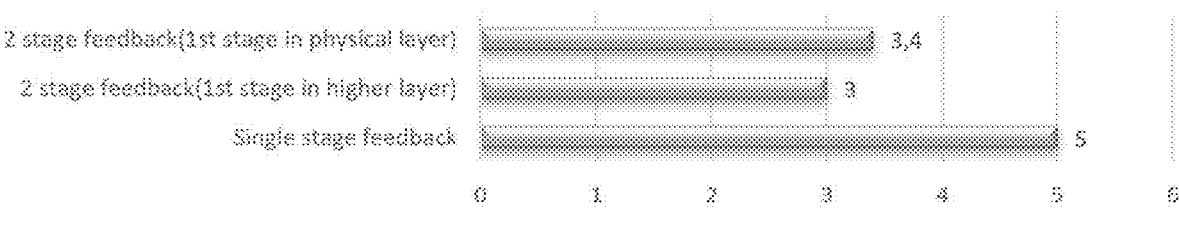

2 stage feedback(1st stage in physical layer)    3,4
2 stage feedback(1st stage in higher layer)    3
Single stage feedback    5

0    1    2    3    4    5    6

☒ Single stage feedback                    ☒ 2 stage feedback(1st stage in higher layer)
☒ 2 stage feedback(1st stage in physical layer)

Baseline (NR without Feedback)
Single-Stage Feedback (High Overhead)
Disclosed Two-Stage Feedback (Low Overhead)

~14%

Throughput [Mbps]

SNR [dB]

DEVICES, METHODS AND COMPUTER PROGRAMS FOR TWO-PART FEEDBACK INFORMATION TRANSMISSION

CROSS-REFERENCE TO RELATED APPLICATIONS

This application is a continuation of International Application No. PCT/CN2021/132836, filed on Nov. 24, 2021, the disclosure of which is hereby incorporated by reference in its entirety.

TECHNICAL FIELD

Embodiments of the present disclosure relate to the field of wireless communications, and more particularly to client devices, network node devices, and related methods and computer programs.

BACKGROUND

In wireless networks, such as the fifth generation (5G) or so called new radio (NR) wireless networks, uplink (UL) channel would equal downlink (DL) channel in theoretical conditions of perfect reciprocity. Typically, a base station may estimate the UL channel based on, e.g., an uplink sounding reference signal (UL SRS). Then, the base station may calculate a downlink precoding matrix based on the estimated version of the UL channel which in the theoretical conditions of perfect reciprocity would perfectly match the DL channel because it would be the same as the actual DL channel.

However, in real conditions perfect reciprocity does not exist. Reasons for this include a mismatch between transmitting and receiving hardware, and specific absorption rate (SAR) control needed at a client device or user equipment (UE). The hardware mismatch results, e.g., from the UL and DL channel not going through the same hardware components in the client device. The SAR control is needed at a client device due to government regulations regarding human exposure to radio frequency (RF) electromagnetic fields (EMF).

Accordingly, to avoid performance loss in performing DL precoding a base station needs to compensate for this incomplete reciprocity.

SUMMARY

Embodiments of the present disclosure provide a selection of concepts in a simplified form that are further described below in the detailed description. This summary is not intended to identify key features or essential features of the claimed subject matter, nor is it intended to be used to limit the scope of the claimed subject matter.

It is an object of the invention to allow a two-part feedback information transmission, e.g., for improved downlink multiple-input and multiple-output (MIMO) precoding in time-division duplex (TDD)-based communication systems. The foregoing and other objects are achieved by the features of the independent claims. Further implementation forms are apparent from the dependent claims, the description and the figures.

According to a first aspect, a client device comprising multiple receiving antennas is provided. The client device is configured to receive a downlink, DL, pilot signal from a network node device via the multiple receiving antennas. The client device is further configured to determine feed-back information based on DL channel power for each receiving antenna of the multiple receiving antennas from the received DL pilot signal. The client device is further configured to transmit a first part of the feedback information to the network node device via a non-physical layer transmission or a physical layer transmission. The client device is further configured to transmit a second part of the feedback information to the network node device via a physical layer transmission. The present disclosure allows two-part feedback information transmission, e.g., for improved downlink MIMO precoding in TDD-based communication systems. The feedback information transmission allows compensating for adverse effects of incomplete UL-DL reciprocity for DL MIMO precoding caused by mismatched DL and UL channel measurements. The feedback information transmission being two-part allows low overhead for the feedback information.

In an implementation form of the first aspect, the feedback information has a quantization range, and the first part of the feedback information comprises an indication of the quantization range. This implementation form allows reporting quantization boundaries, thereby allowing tailoring the quantization range to a given scenario. The indicated quantization range may be valid for a period of time, and thus it can be smaller than a static range.

In an implementation form of the first aspect, the indication of the quantization range comprises at least one of a starting value of the quantization range, an ending value of the quantization range, a center value of the quantization range, or a length of the quantization range. This implementation form allows reporting quantization boundaries, thereby allowing tailoring the quantization range to a given scenario. The indicated quantization range may be valid for a period of time, and thus it can be smaller than a static range.

In an implementation form of the first aspect, the second part of the feedback information comprises an indication of quantized values of the DL channel power for each receiving antenna of the multiple receiving antennas within the quantization range. This implementation form allows using only a few bits for the indication of the quantized values, thereby allowing a low physical layer overhead for the feedback information.

In an implementation form of the first aspect, the quantized values of the DL channel power for each receiving antenna of the multiple receiving antennas comprise relative values that are relative to at least one of the starting value of the quantization range, the ending value of the quantization range, or the center value of the quantization range. This implementation form allows using only a few bits for the indication of the quantized values, thereby allowing a low physical layer overhead for the feedback information.

In an implementation form of the first aspect, the quantized values of the DL channel power for each receiving antenna of the multiple receiving antennas comprise differential values that indicate a difference to at least one of the starting value of the quantization range, the ending value of the quantization range, or the center value of the quantization range. This implementation form allows using only a few bits for the indication of the quantized values, thereby allowing a low physical layer overhead for the feedback information.

In an implementation form of the first aspect, the client device is further configured to transmit the first part of the feedback information periodically, aperiodically, semi-persistently or semi-statically, and to transmit the second part of the feedback information periodically, aperiodically, semi-persistently, or mutedly. The feedback information transmission being two-part allows low overhead for the feedback information.

In an implementation form of the first aspect, the received DL pilot signal comprises a mismatch state information reference signal, MSI-RS, a channel state information reference signal, CSI-RS, or a synchronization signal block, SSB. This implementation form allows two-part feedback information transmission, e.g., for improved downlink MIMO precoding in TDD-based communication systems.

In an implementation form of the first aspect, the client device comprises a time-division duplex, TDD, capable client device. This implementation form allows two-part feedback information transmission, e.g., for improved downlink MIMO precoding in TDD-based communication systems.

In an implementation form of the first aspect, the client device comprises a multiple-input and multiple-output, MIMO, capable client device. This implementation form allows two-part feedback information transmission, e.g., for improved downlink MIMO precoding in TDD-based communication systems.

In an implementation form of the first aspect, the client device is further configured to perform channel estimation for each receiving antenna of the multiple receiving antennas based on the received DL pilot signal, thereby obtaining a channel estimate for each receiving antenna of the multiple receiving antennas. This implementation form allows two-part feedback information transmission, e.g., for improved downlink MIMO precoding in TDD-based communication systems.

In an implementation form of the first aspect, the determining of the feedback information based on the DL channel power for each receiving antenna of the multiple receiving antennas from the received DL pilot signal comprises determining the feedback information based on the DL channel power for each receiving antenna of the multiple receiving antennas from the obtained channel estimates. This implementation form allows two-part feedback information transmission, e.g., for improved downlink MIMO precoding in TDD-based communication systems.

In an implementation form of the first aspect, the client device is further configured to perform quantization on the determined feedback information. This implementation form allows a low physical layer overhead for the feedback information.

In an implementation form of the first aspect, the second part of the feedback information is transmitted to the network node device via the physical layer transmission separately from the first part of the feedback information. This implementation form allows high resolution feedback information without burdening physical layer resources.

According to a second aspect, a method is provided. The method comprises receiving, at a client device comprising multiple receiving antennas, a downlink, DL, pilot signal from a network node device via the multiple receiving antennas. The method further comprises determining, by the client device, feedback information based on DL channel power for each receiving antenna of the multiple receiving antennas from the received DL pilot signal. The method further comprises transmitting, by the client device, a first part of the feedback information to the network node device via a non-physical layer transmission or a physical layer transmission. The method further comprises transmitting, by the client device, a second part of the feedback information to the network node device via a physical layer transmission. The present disclosure allows two-part feedback information transmission, e.g., for improved downlink MIMO precoding in TDD-based communication systems. The feedback information transmission allows compensating for adverse effects of incomplete UL-DL reciprocity for DL MIMO precoding caused by mismatched DL and UL channel measurements. The feedback information transmission being two-part allows low overhead for the feedback information.

In an implementation form of the second aspect, the feedback information has a quantization range, and the first part of the feedback information comprises an indication of the quantization range. This implementation form allows reporting quantization boundaries, thereby allowing tailoring the quantization range to a given scenario. The indicated quantization range may be valid for a period of time, and thus it can be smaller than a static range.

In an implementation form of the second aspect, the indication of the quantization range comprises at least one of a starting value of the quantization range, an ending value of the quantization range, a center value of the quantization range, or a length of the quantization range. This implementation form allows reporting quantization boundaries, thereby allowing tailoring the quantization range to a given scenario. The indicated quantization range may be valid for a period of time, and thus it can be smaller than a static range.

In an implementation form of the second aspect, the second part of the feedback information comprises an indication of quantized values of the DL channel power for each receiving antenna of the multiple receiving antennas within the quantization range. This implementation form allows using only a few bits for the indication of the quantized values, thereby allowing a low physical layer overhead for the feedback information.

In an implementation form of the second aspect, the quantized values of the DL channel power for each receiving antenna of the multiple receiving antennas comprise relative values that are relative to at least one of the starting value of the quantization range, the ending value of the quantization range, or the center value of the quantization range. This implementation form allows using only a few bits for the indication of the quantized values, thereby allowing a low physical layer overhead for the feedback information.

In an implementation form of the second aspect, the quantized values of the DL channel power for each receiving antenna of the multiple receiving antennas comprise differential values that indicate a difference to at least one of the starting value of the quantization range, the ending value of the quantization range, or the center value of the quantization range. This implementation form allows using only a few bits for the indication of the quantized values, thereby allowing a low physical layer overhead for the feedback information.

In an implementation form of the second aspect, the method further comprises transmitting, by the client device, the first part of the feedback information periodically, aperiodically, semi-persistently or semi-statically, and transmitting, by the client device, the second part of the feedback information periodically, aperiodically, semi-persistently, or mutedly. The feedback information transmission being two-part allows low overhead for the feedback information.

In an implementation form of the second aspect, the received DL pilot signal comprises a mismatch state information reference signal, MSI-RS, a channel state information reference signal, CSI-RS, or a synchronization signal block, SSB. This implementation form allows two-part feedback information transmission, e.g., for improved downlink MIMO precoding in TDD-based communication systems.

In an implementation form of the second aspect, the client device comprises a time-division duplex, TDD, capable client device. This implementation form allows two-part feedback information transmission, e.g., for improved downlink MIMO precoding in TDD-based communication systems.

In an implementation form of the second aspect, the client device comprises a multiple-input and multiple-output, MIMO, capable client device. This implementation form allows two-part feedback information transmission, e.g., for improved downlink MIMO precoding in TDD-based communication systems.

In an implementation form of the second aspect, the method further comprises performing, by the client device, channel estimation for each receiving antenna of the multiple receiving antennas based on the received DL pilot signal, thereby obtaining a channel estimate for each receiving antenna of the multiple receiving antennas. This implementation form allows two-part feedback information transmission, e.g., for improved downlink MIMO precoding in TDD-based communication systems.

In an implementation form of the second aspect, the determining of the feedback information based on the DL channel power for each receiving antenna of the multiple receiving antennas from the received DL pilot signal comprises determining the feedback information based on the DL channel power for each receiving antenna of the multiple receiving antennas from the obtained channel estimates. This implementation form allows two-part feedback information transmission, e.g., for improved downlink MIMO precoding in TDD-based communication systems.

In an implementation form of the second aspect, the method further comprises performing, by the client device, quantization on the determined feedback information. This implementation form allows a low physical layer overhead for the feedback information.

In an implementation form of the second aspect, the second part of the feedback information is transmitted to the network node device via the physical layer transmission separately from the first part of the feedback information. This implementation form allows high resolution feedback information without burdening physical layer resources.

According to a third aspect, a computer program product is provided. The computer program product comprises program code configured to perform the method according to the second aspect, when the program code is executed on a computer. The present disclosure allows two-part feedback information transmission, e.g., for improved downlink MIMO precoding in TDD-based communication systems. The feedback information transmission allows compensating for adverse effects of incomplete UL-DL reciprocity for DL MIMO precoding caused by mismatched DL and UL channel measurements. The feedback information transmission being two-part allows low overhead for the feedback information.

According to a fourth aspect, a network node device is provided. The network node device is configured to receive a first part of feedback information from a client device via a non-physical layer transmission or a physical layer transmission, the feedback information determined by the client device based on downlink, DL, channel power for each receiving antenna of multiple receiving antennas of the client device from a DL pilot signal received by the client device. The network node device is further configured to receive a second part of the feedback information from the client device via a physical layer transmission. The network node device is further configured to determine a correlation matrix for DL precoding at least partly based on the received first part of the feedback information and the received second part of the feedback information. The present disclosure allows two-part feedback information transmission, e.g., for improved downlink MIMO precoding in TDD-based communication systems. The feedback information transmission allows compensating for adverse effects of incomplete UL-DL reciprocity for DL MIMO precoding caused by mismatched DL and UL channel measurements. The feedback information transmission being two-part allows low overhead for the feedback information.

According to a fifth aspect, a method is provided. The method comprises receiving, at a network node device, a first part of feedback information from a client device via a non-physical layer transmission or a physical layer transmission, the feedback information determined by the client device based on downlink, DL, channel power for each receiving antenna of multiple receiving antennas of the client device from a DL pilot signal received by the client device. The method further comprises receiving, at the network node device, a second part of the feedback information from the client device via a physical layer transmission. The method further comprises determining, by the network node device, a correlation matrix for DL precoding at least partly based on the received first part of the feedback information and the received second part of the feedback information. The present disclosure allows two-part feedback information transmission, e.g., for improved downlink MIMO precoding in TDD-based communication systems. The feedback information transmission allows compensating for adverse effects of incomplete UL-DL reciprocity for DL MIMO precoding caused by mismatched DL and UL channel measurements. The feedback information transmission being two-part allows low overhead for the feedback information.

According to a sixth aspect, a computer program product is provided. The computer program product comprises program code configured to perform the method according to the fifth aspect, when the program code is executed on a computer. The present disclosure allows two-part feedback information transmission, e.g., for improved downlink MIMO precoding in TDD-based communication systems. The feedback information transmission allows compensating for adverse effects of incomplete UL-DL reciprocity for DL MIMO precoding caused by mismatched DL and UL channel measurements. The feedback information transmission being two-part allows low overhead for the feedback information.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which:

FIG. 4C is a diagram illustrating a comparison between a static single-part feedback information transmission and a two-part feedback information transmission;

FIG. 5 is a flow chart illustrating precoding;

FIG. 6 is a diagram comparing average physical layer overheads;

FIG. 7 is a diagram comparing throughputs; and

Figure 1A:
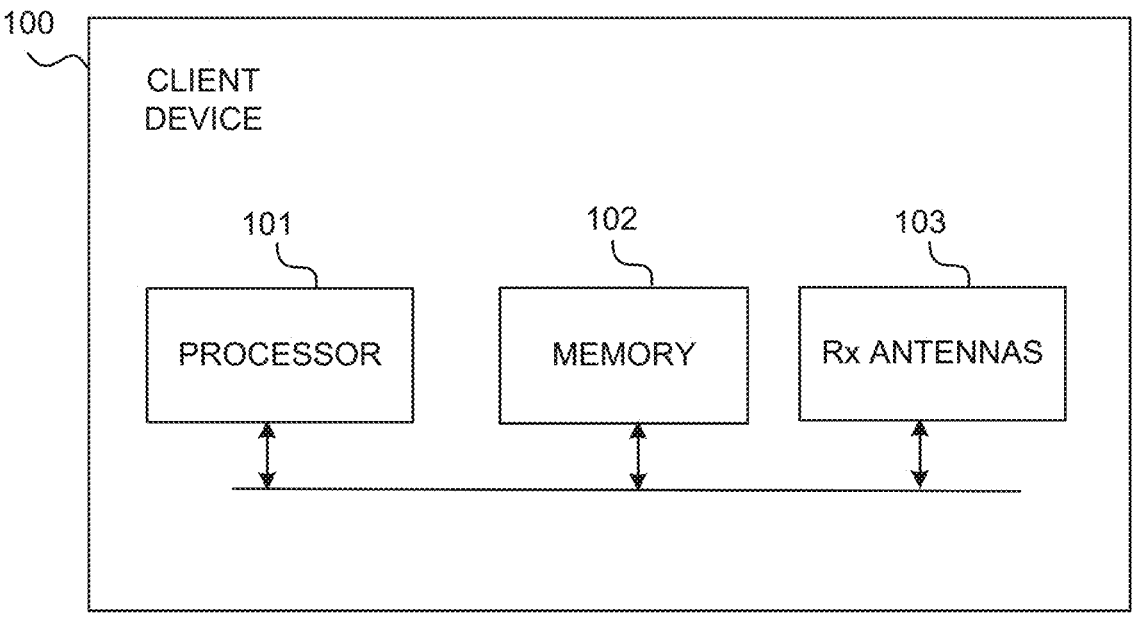
FIG. 1A is a block diagram illustrating a client device.

In the following, identical reference signs refer to identical or at least functionally equivalent features.

DETAILED DESCRIPTION

In the following description, reference is made to the accompanying drawings, which form part of the disclosure, and in which are shown, by way of illustration, specific aspects in which the invention may be placed. It is understood that other aspects may be utilized and structural or logical changes may be made without departing from the scope of the invention. The following detailed description, therefore, is not to be taken in a limiting sense, as the scope of the invention is defined in the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

In a time division duplex (TDD) system, assuming there are N antennas at a network node device and K antennas at a client device or user equipment (UE), a downlink (DL) channel may be expressed as:

$$
H_{DL} = \begin{bmatrix} h_1 \\ h_2 \\ \vdots \\ h_K \end{bmatrix} = \begin{bmatrix} h_{11} & h_{12} & \cdots & h_{1N} \\ h_{21} & h_{22} & \ddots & \vdots \\ \vdots & \ddots & \ddots & h_{K-1,N} \\ h_{K1} & \cdots & h_{K,N-1} & h_{KN} \end{bmatrix} \tag{1}
$$

If perfect reciprocity holds, an uplink channel satisfies $H_{UL}=H_{DL}$, which means that the network node device can estimate $H_{DL}$ based on, e.g., an uplink sounding reference signal (UL SRS). Then, the network node device may calculate a downlink precoding matrix based on the estimated version of $H_{UL}$, which can perfectly match the downlink channel because it is the same as the actual downlink channel. In particular, the precoding matrix may be formed based on eigenvectors of a correlation matrix which may be determined for example based on:

$$
R_{DL} \overset{def}{=} H_{DL}^H H_{DL} = H_{UL}^H H_{UL} \tag{2}
$$

However, in real-life conditions, there are reasons that cause incomplete TDD reciprocity: mismatch between receiving and transmitting hardware, and specific absorption rate (SAR) control at the client device.

The reason for the hardware mismatch results from the UL and DL channel not going through the same components. The hardware mismatch may be modeled, e.g., as a power reduction factor $\alpha_r \in (0,1]$ and a phase rotation $\theta_r \in [-\pi,\pi]$ for each client device antenna r for uplink.

As for the SAR control, there are regulations from various governments regarding human exposure to radio frequency (RF) electromagnetic fields (EMF). In particular, a client device should comply with a SAR limit issued by the government of a given country. The client device may perform SAR control by measuring a total transmitted power over a period. A control action may include the client device reducing its power by measuring its average transmitted power over a period. For example, this period may be around 40 milliseconds (ms). Thus, the power of some/all antennas may be reduced to satisfy a prescribed SAR threshold. So, it may be modeled as a power reduction factor $\beta_r \in (0,1]$ of an UL SRS transmitted from a client device 100 antenna r. SAR control may be for uplink only. A typical value of $\beta_r$ satisfies $\beta_r \in (0.1, 1]$.

Combining the impacts of both the hardware mismatch and the SAR control, an equivalent uplink channel may be re-modelled as:

$$
\bar{H}_{UL} = \begin{bmatrix} \bar{h}_1 \\ \bar{h}_2 \\ \vdots \\ \bar{h}_K \end{bmatrix} = \begin{bmatrix} \alpha_1 \beta_1 e^{j\theta_1} h_1 \\ \alpha_2 \beta_2 e^{j\theta_2} h_2 \\ \vdots \\ \alpha_K \beta_K e^{j\theta_M} h_K \end{bmatrix} \tag{3}
$$

which may be estimated based on the received SRS at the network node device. Thus, the correlation matrix determined based on an uplink channel according to Eq. (2) may become:

$$
\bar{R}_{DL} = \bar{H}_{UL}^H \bar{H}_{UL} = H_{DL}^H \begin{bmatrix} \alpha_1^2 \beta_1^2 & 0 & \cdots & 0 \\ 0 & \alpha_2^2 \beta_2^2 & \ddots & \vdots \\ \vdots & \ddots & \ddots & 0 \\ 0 & \cdots & 0 & \alpha_K^2 \beta_K^2 \end{bmatrix} H_{DL} \tag{4}
$$

It is noted that the determination of the DL correlation matrix in Eq. (4) based on $H_{UL}$ is an example and other approaches may be utilized to determine the DL correlation matrix, including taking an average over time and/or frequency. In addition, different types of filters, e.g., a Wiener filter may be used to obtain a suitable estimate of $R_{DL}$.

If $\alpha_r \neq 1$ and $\beta_r \neq 1$, one can find that $\bar{R}_{DL} \neq R_{DL}$, and thus a precoder generated based on eigenvectors of $\bar{R}_{DL}$ cannot match the downlink channel, which results in performance loss.

Figure 8:
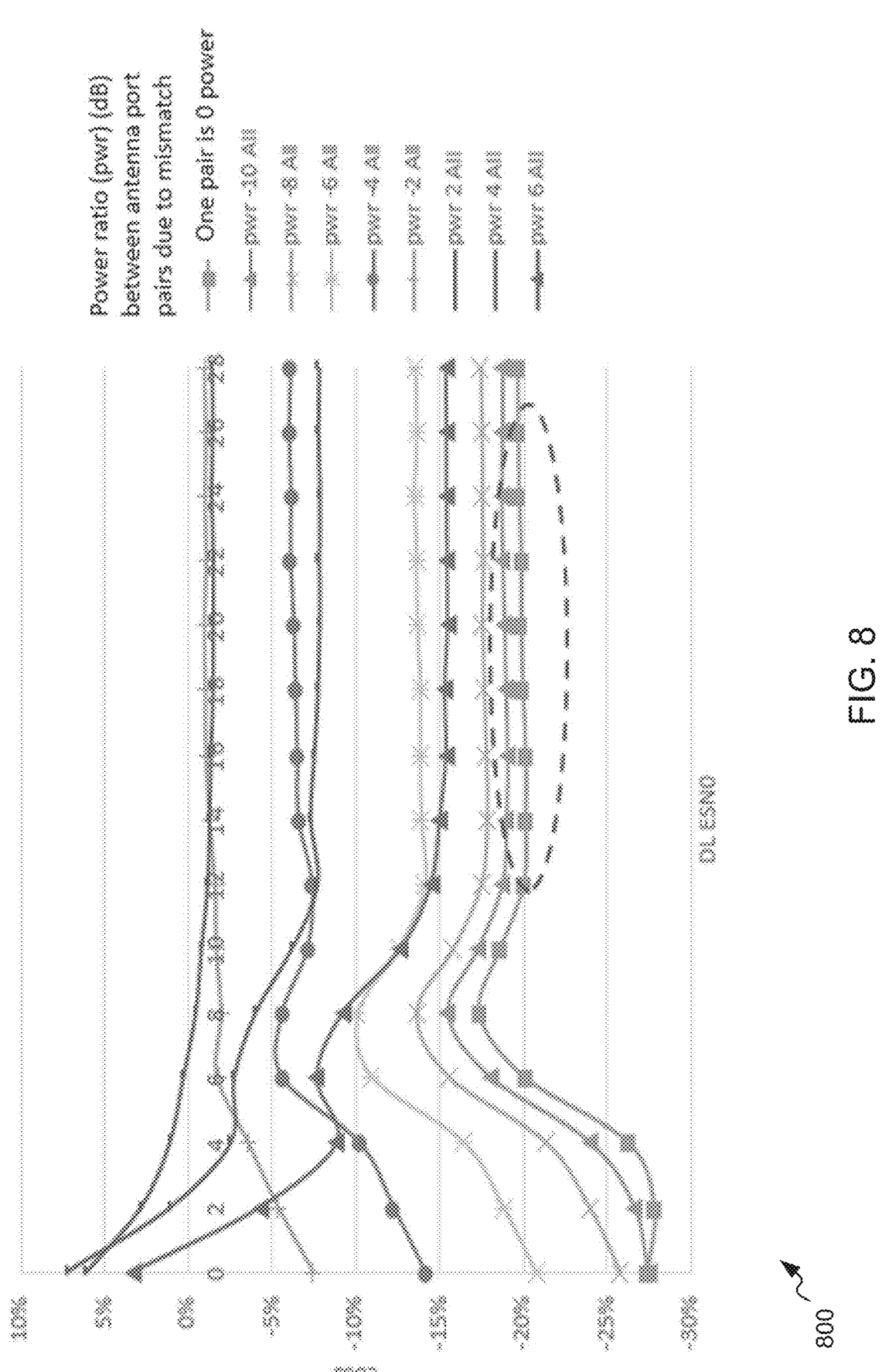
FIG. 8 is a diagram illustrating loss in throughput due to incomplete UL-DL reciprocity.

When the existence of this incomplete reciprocity issue is not accounted for, a notable degradation in the performance may be caused. For example, for a network node device with a 64Tx/64Rx antennas communicating to a client device with 2Tx/4Rx antennas, the loss may be up to 20%, as illustrated in diagram 800 of FIG. 8.

To provide feedback from a client device to a network node device, the client device may construct a report based on the power of $h_i$, where i=1, 2, . . . K. According to equation (3), this results in:

$$\alpha_i^2 \beta_i^2 = |\bar{h}_i|^2 / |h_i|^2 \qquad (5)$$

for i=1, 2, . . . K, where |·| denotes the Euclidean norm. Eq. (5) may be calculated at the network node device because $|\bar{h}_i|^2$ may be obtained by its uplink measurement(s) and $|h_i|^2$ may be obtained from the client device reporting. Then, the network node device may calculate the correlation matrix by, e.g.:

$$\tilde{R}_{DL} = \bar{H}_{UL}^H \begin{bmatrix} \alpha_1^{-2}\beta_1^{-2} & 0 & \cdots & 0 \\ 0 & \alpha_2^{-2}\beta_2^{-2} & \ddots & \vdots \\ \vdots & \ddots & \ddots & 0 \\ 0 & \cdots & 0 & \alpha_K^{-2}\beta_K^{-2} \end{bmatrix} \bar{H}_{UL} \qquad (6)$$

Substituting Eq. (3) into Eq. (6), one can obtain $\tilde{R}_{DL} = R_{DL}$, i.e., the network node device may form a downlink precoding matrix based on the $\tilde{R}_{DL}$ matching the downlink channel.

In some implementations, it may be assumed that the range of a possible power mismatch is known—for example, it can be specified in fifth generation (5G) new radio (NR) standards. Therefore, the standard may also specify a certain number of bits to quantize that power range while fulfilling agreed requirements for residual mismatch tolerance. The problem with this is that the number of bits for transmitting the power reduction factors from client devices might be unnecessarily large to cover the maximum power mismatch range specified in the standard. In reality, client devices from different manufactures may have different ranges of power values, so the overhead of transmitting power reduction factors would be unnecessarily large for those client devices with a small power mismatch range.

The present disclosure allows providing low overhead feedback from a client device 100 to a network node device 110 to compensate for the adverse effects of the incomplete UL-DL reciprocity for downlink multiple-input and multiple-output (DL MIMO) precoding caused by mismatched DL and UL channel measurements that may stem from, e.g., different circuitries used at the client device 100 and the network node device 110 as well as from an implementation of SAR operation for limiting electromagnetic radiation from the client device 100.

Figure 2:
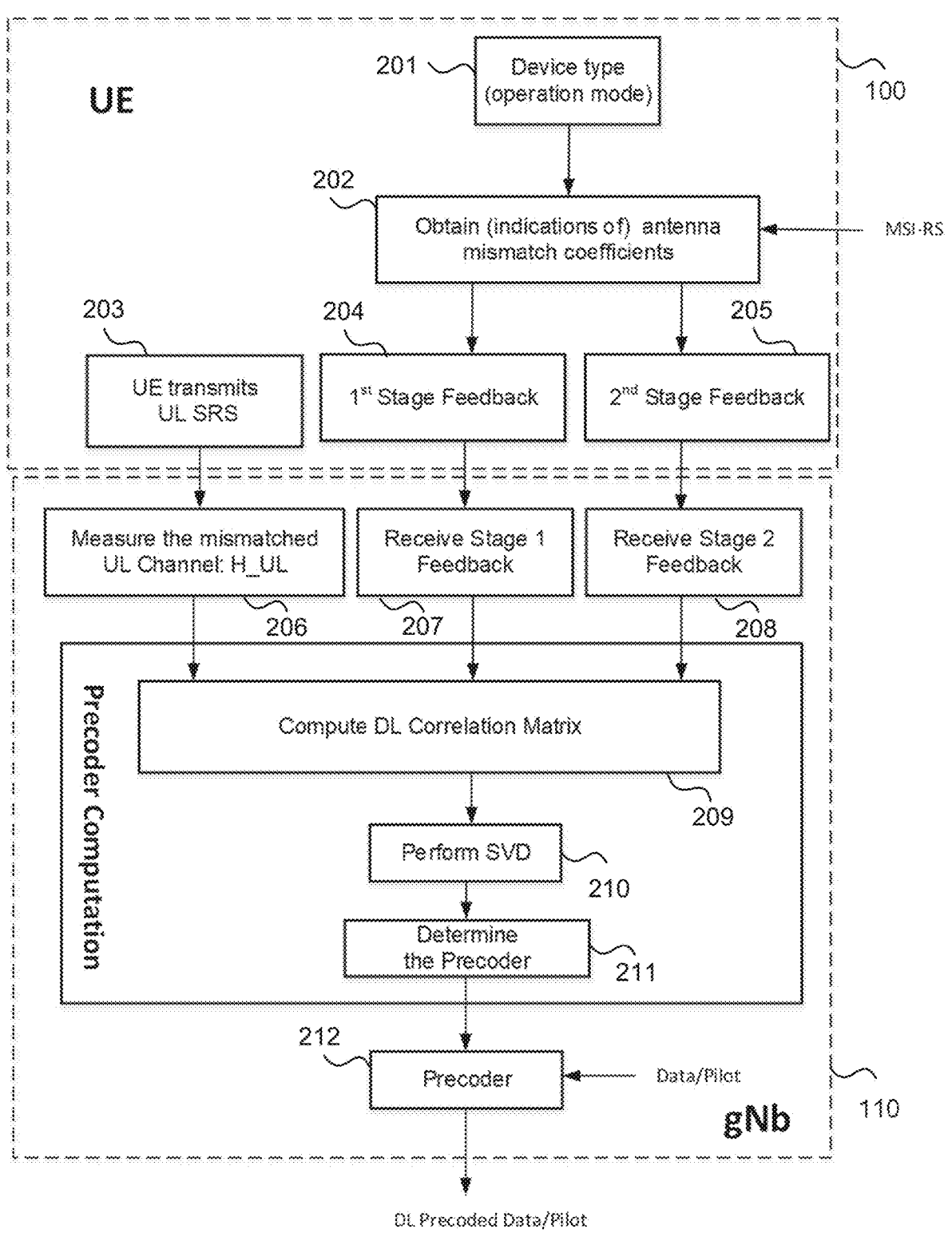
FIG. 2 is a diagram illustrating functional components at a client device and a network node device.

As illustrated in diagram 200 of FIG. 2, present disclosure allows two-part feedback from the client device 100 to the network node device 110, by which e.g., an enhanced DL MIMO precoding matrix for a TDD-based systems may then be configured. In an embodiment, the $1^{st}$ part indicating a range of quantization may be transmitted over a higher layer which may have a long period (blocks 204, 207). The $2^{nd}$ part may be transmitted using, e.g., digital low overhead feedback of a few bits over a physical layer (blocks 205, 208). The feedback signals at the client device 100 may be obtained based on, e.g., a mismatch state information reference signal (MSI-RS) transmitted from the network node device 110 to the client device 100 (blocks 201-202).

Further, the client device 100 may transmit an uplink sounding reference signal (UL SRS) (block 203) which the network node device 110 may use to measure the mismatched UL channel (block 206).

In an implementation, the received feedback signals in the $1^{st}$ and the $2^{nd}$ parts may be used to construct a correlation matrix of the DL channel as if there was no mismatch (block 209). Then, the DL precoder may be constructed for precoding of DL data and pilot (blocks 210-212). The overhead of the two-part feedback, e.g., the physical layer overhead, is notably less than that of the single-part feedback. Furthermore, the introduction of the first part has no practical impact on the duration of the original UL information transfer, as the transmission of the first part happens very rarely. Overall, the disclosed two-part scheme in practical setups may provide a 40% overhead reduction compared to the single-part feedback, while maintaining the same throughput gain of 14% with respect to solutions without any feedback.

In the following examples, a transmission link between a network node device 110 having N transmit antennas and a client device 100 having K antennas is assumed.

Next, example embodiments of a client device 100 are described based on FIG. 1A. Some of the features of the described devices are optional features which may provide further advantages.

FIG. 1A is a block diagram illustrating the client device 100, according to an embodiment of the present disclosure. In an embodiment, the client device 100 may comprise any of various types of devices used directly by an end user entity and capable of communication in a wireless network, such as user equipment (UE). Such devices include but are not limited to smartphones, tablet computers, smart watches, lap top computers, internet-of-things (IOT) devices, etc. For example, the client device 100 may comprise a time-division duplex (TDD) capable client device. Alternatively/additionally, the client device 100 may comprise a multiple-input and multiple-output (MIMO) capable client device.

The client device 100 comprises multiple receiving antennas 103. The client device 100 may comprise at least one processor or a processing unit 101 and at least one memory 102 coupled to the at least one processor 101, which may be used to implement the functionalities described later in more detail.

The client device 100 may also include other elements, such as a transceiver configured to enable the client device 100 to transmit and/or receive information to/from other devices, as well as other elements not shown in FIG. 1A. In one example, the client device 100 may use the transceiver to transmit or receive signalling information and data in accordance with at least one cellular communication protocol. The transceiver may be configured to provide at least one wireless radio connection, such as for example a 3GPP mobile broadband connection (e.g., 5G). The transceiver may comprise, or be configured to be coupled to, at least one antenna (including the multiple receiving antennas 103) to transmit and/or receive radio frequency signals.

The at least one processor 101 may include, e.g., one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 102 may be configured to store e.g. computer programs and the like. The memory may include one or more volatile memory devices, one or more non-volatile memory devices, and/or a combination of one or more volatile memory devices and non-volatile memory devices. For example, the memory 102 may be embodied as semiconductor memories (such as mask ROM, PROM (programmable ROM), EPROM (erasable PROM), flash ROM, RAM (random access memory), etc.).

The client device 100 is configured to receive a downlink (DL) pilot signal from a network node device 110 via the multiple receiving antennas 103. For example, the received DL pilot signal may comprise a mismatch state information reference signal (MSI-RS), a channel state information reference signal (CSI-RS), or a synchronization signal block (SSB).

In other words, the network node device 110 may transmit, e.g., a set of mismatch state information reference signals which may include a channel state information reference signal as well as a synchronization signal block in NR. The purpose is to probe the mismatch at the client device 100.

Potentially, an MSI-RS may be sparser than a CSI-RS/SSB, because the disclosure may still work if a correct estimation of the power ratios is enabled. That is, if the power ratio can still remain the same across the antennas, a type of MSI-RS may be used that is emitted from a reference antenna port such that the client device 100 can determine the mismatch indications.

In an embodiment, the client device 100 may be further configured to perform channel estimation for each receiving antenna of the multiple receiving antennas 103 based on the received DL pilot signal, thereby obtaining a channel estimate for each receiving antenna of the multiple receiving antennas 103.

In other words, the client device 100 having $N' \leq N$ antenna ports may perform, based on the received DL pilots (i.e., reference signals), a channel estimation for each receiving antenna. If $N'=N$ and assuming perfect channel estimation for the time being, the estimated DL channel $H_{DL}$ may be denoted as:

$$H_{DL} = \begin{bmatrix} h_1 \\ h_2 \\ \vdots \\ h_K \end{bmatrix} = \begin{bmatrix} h_{11} & h_{12} & \cdots & h_{1N} \\ h_{21} & h_{22} & \ddots & \vdots \\ \vdots & \ddots & \ddots & h_{K-1,N} \\ h_{K1} & \cdots & h_{K,N-1} & h_{KN} \end{bmatrix}, \quad (7)$$

where $h_i=[h_{i1} \ldots h_{iN}]$ is the channel between the network node device 110 antennas and the i-th antenna at the client device 100 with the size 1×N, in which N is the number of antennas at the network node device 110 and $h_{l,k}$ is the channel between antenna l at the network node device 110 and antenna k at the client device 100. If $N'<N$, the N in Eq. (3) may be replaced by N'. In this example, it is assumed that $N'=N$. Here, for illustration purposes, a perfect channel estimation is assumed. A noisy channel estimation (e.g., when the estimate is written as $H_{DL}+e$ where e denotes the estimation error) may be treated similarly throughout.

The client device 100 is further configured to determine feedback information based on DL channel power for each receiving antenna of the multiple receiving antennas 103 from the received DL pilot signal.

In the embodiment of the client device 100 being further configured to perform the channel estimation, the determining of the feedback information based on the DL channel power for each receiving antenna of the multiple receiving antennas 103 from the received DL pilot signal may comprise determining the feedback information based on the DL channel power for each receiving antenna of the multiple receiving antennas 103 from the obtained channel estimates.

In an embodiment, the client device 100 may be further configured to perform quantization on the determined feedback information.

In other words, based on the estimated DL channel $H_{DL}$ the client device 100 may construct a feedback signal. The purpose of the feedback signal may include enabling the network node device 110 to adjust the UL channel estimation which may be performed, e.g., by using an SRS transmitted from the client device 100. To allow this, the disclosure provides a very low overhead feedback report that may mitigate the mismatch between the UL channel estimated via the SRS and the actual DL channel.

Since a downlink pilot power is determined by the downlink channel power, in the following description it is assumed that the feedback signal is determined based on a downlink channel, such that a scaled downlink channel power may be expressed as:

$$x_{FS} = g \begin{bmatrix} |h_1|^2 \\ |h_2|^2 \\ \vdots \\ |h_K|^2 \end{bmatrix} \quad (7a)$$

where g is a scaling factor. The digital feedback signal may be based on quantization of $x_{FS}$ such that $$x_{q,FS} = Q(x_{FS}) \quad (7b)$$

where Q(.) denotes quantization mapping.

Figure 4A:
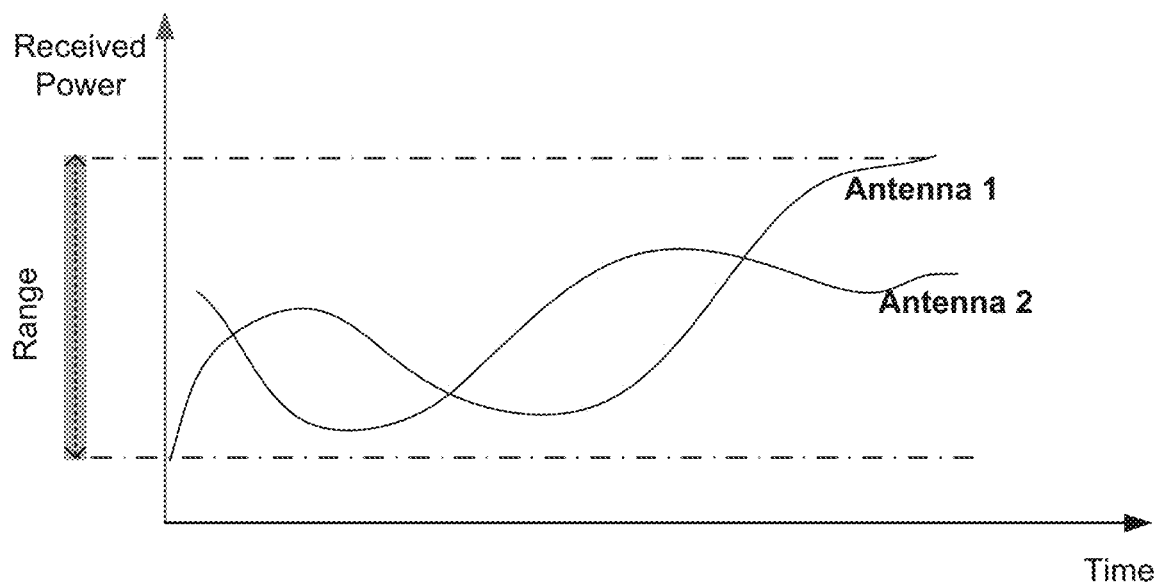
FIG. 4A is a diagram illustrating a quantizer input range for a static single-part feedback information transmission.

In the single-part feedback transmission, the range for quantization is assumed to be static, and then the quantization is done to produce digital feedback. However, to have a static range, the range needs to be wide enough to encompass all possible realizations, modes and configurations. This is illustrated by diagram 400A of FIG. 4A, showing that the quantizer for the single-part feedback transmission needs to be designed for a range that includes all the input values (i.e., received power at all the antennas). This leads to two effects: the first one is that for a given number of bits the quantization resolution would have to be sacrificed considerably, and the second one is that to keep a good resolution (e.g., in cases of the range being narrower), the number of quantization bits for cases with a wider range would have to be notably increased. The first effect may lead to a low accuracy of the feedback, and the second effect may lead to a high feedback overhead.

In the disclosed two-part feedback, the input value to the quantizer that needs to be quantified may include any of the following:

a value of $|h_i|^2$ where i=1, 2, . . . , k or its scaled value $g|h_i|^2$;

a relative value of $|h_i|_2$, e.g., $|h_i|^2/|h_\alpha|^2$, where i=1, 2, . . . , k, and $\alpha$=1, 2, . . . , k is a reference antenna index, and i≠α; and/or an averaged relative value of a multiple $|h_i|^2$. This may be used, e.g., when the mismatch on multiple antennas may be considered as the same. For example, for a 2T4R antenna client device 100, the mismatch factors for two antennas may be considered as the same, and for the remaining two antennas may also be considered as the same. Thus, the feedback prior to the quantization may be calculated as $$\frac{|h_{i1}|^2 + |h_{i2}|^2}{|h_{i3}|^2 + |h_{i4}|^2},$$

where antennas i1 and i2 have the same mismatch, and antennas i3 and i4 have the same mismatch. Another example for feedback construction includes $$\frac{|h_{i1}|^2 + |h_{i2}|^2}{|h_{i3}|^2 + |h_{i4}|^2}.$$

This example may be extended to larger MIMO systems at the client device 100, such as 2T8R antenna client devices and 4T8R antenna client devices.

The client device 100 is further configured to transmit a first part of the feedback information to the network node device 110 via a non-physical layer transmission or a physical layer transmission, and the client device 100 is further configured to transmit a second part of the feedback information to the network node device 110 via a physical layer transmission. In an embodiment, the second part of the feedback information may be transmitted to the network node device 110 separately from the first part of the feedback information.

In other words, the disclosed two-part feedback may comprise two parts to report the values calculated prior to the quantization. This approach allows addressing the shortcomings that may arise with the single-part feedback.

The feedback information may have a quantization range, and the first part of the feedback information may comprise an indication of the quantization range.

In other words, the client device 100 may report the quantization range in the first part. In an embodiment, the communication of the first part of the feedback may occur on a higher layer, e.g., on layer 2 or layer 3. A benefit of this is that high-resolution feedback is possible, and at the same time physical layer resources are not burdened.

For example, the indication of the quantization range may comprise a starting value of the quantization range, an ending value of the quantization range, a center value of the quantization range, and/or a length of the quantization range.

In other words, the indication of the quantization range may comprise, e.g.:

- the client device 100 may report a quantified starting value, ending value, or center value of the range, and also the length of the range, where the length may be reported, e.g., from a set of predefined values;
- the client device 100 may report a quantified starting value, ending value, or center value of the range, and the length of the range may be predefined or configured by the network node device 110;
- the client device 100 may report the length of the range, and the starting value, ending value, and/or center value of the range may be predefined or configured by the network node device 110;
- the client device 100 may report two of: a quantified starting value, ending value, and center value of the range; and/or
- the client device 100 may report a quantified starting value, ending value, or center value of the range, and one of them may be predefined or configured by the network node device 110.

In the above embodiment, the reported information may be jointly mapped or encoded.

The quantization range may be configured by the network node device 110 based on previous reports from the client device 100. In this case, the quantization range may be determined by the network node device 110.

The second part of the feedback information may comprise an indication of quantized values of the DL channel power for each receiving antenna of the multiple receiving antennas 103 within the quantization range.

In other words, the second part is for feeding back the information of the quantized value of $x_{FS}$, defined as $\tilde{x}_{q,FS}$, within the range reported in the first part.

For example, the quantized values of the DL channel power for each receiving antenna of the multiple receiving antennas 103 may comprise relative values. The relative values are relative to the starting value of the quantization range, the ending value of the quantization range, and/or the center value of the quantization range.

In other words, $\tilde{x}_{q,FS}$ may be a quantized value of the value of $x_{FS}$ relative to $\overline{x}_{q,FS}$, where $\overline{x}_{q,FS}$ may act as a reference point which may comprise, e.g., the starting value, ending value, or center value of the range in the first part. This may yield a mapping $\tilde{x}_{q,FS}=Q(x_{FS}/\overline{x}_{q,FS})$.

In another example, the quantized values of the DL channel power for each receiving antenna of the multiple receiving antennas 103 may comprise differential values. The differential values indicate a difference to the starting value of the quantization range, the ending value of the quantization range, and/or the center value of the quantization range.

In other words, $\tilde{x}_{q,FS}$ may be determined by a difference of the quantized value of $x_{FS}$ and the quantized value of $\overline{x}_{q,FS}$, where $\overline{x}_{q,FS}$ may comprise the starting value, ending value, or center value of the quantization range in the first part. This may yield a mapping $$\tilde{x}_{q,Fs} = Q(x_{FS}) - Q(\overline{x}_{q,FS}).$$

In an embodiment, both the first and second parts may be transmitted over the physical layer. The benefits of this may include the range feedback being faster compared to the higher layer feedback, and the overhead being reduced compared to the single-part feedback.

The client device 100 may be further configured to transmit the first part of the feedback information periodically, aperiodically, semi-persistently or semi-statically. Furthermore, the client device 100 may be further configured to transmit the second part of the feedback information periodically, aperiodically, semi-persistently, or mutedly.

Figure 4B:
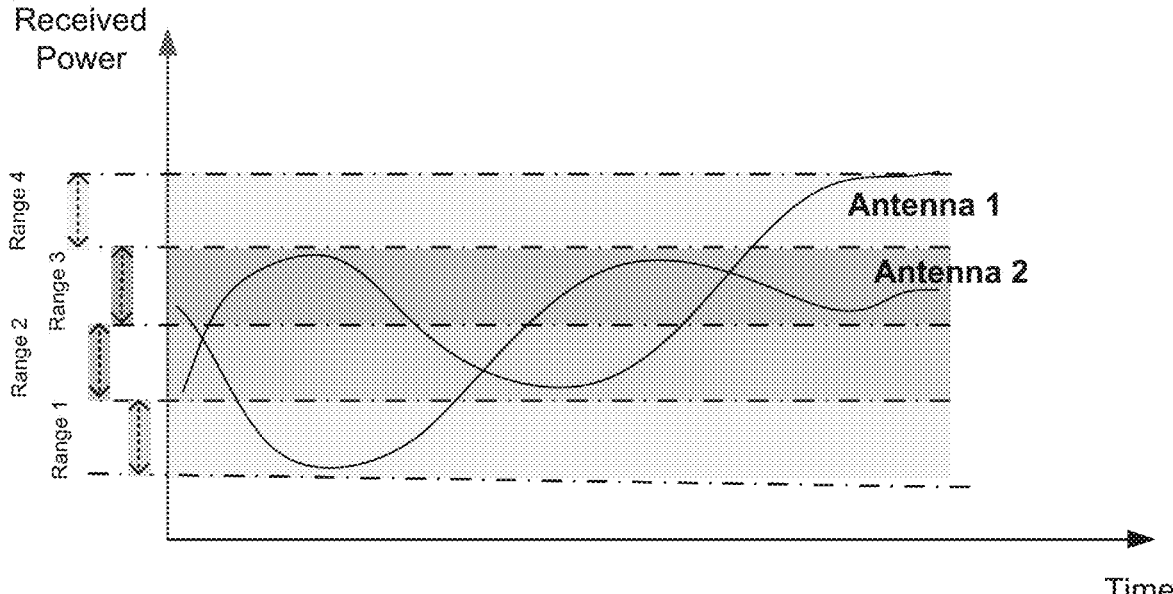
FIG. 4B is a diagram illustrating a quantizer input range for a two-part feedback information transmission.

Diagram 400A of FIG. 4A shows examples of the static range or single-part feedback, and diagram 400B of FIG. 4B shows examples the two-part feedback. FIG. 4C shows a comparison of the single-part feedback 400C and the two-part feedback 410C, with the dashed interval showing different ranges in the two-part report. In the static range feedback, most of the values in all scenarios are included in the static range. That is, a static range may in practice require including values that are relevant for most scenarios or even to a worst-case scenario which may demand a larger quantization range. However, when using the two-part feedback, using the first part the range may be tailored to a given scenario in a given period of time, and then the second part may be performed. The reported range is valid for the given period of time, and thus the reported range can be smaller than the static range, as illustrated in FIG. 4B. As a result, less bits may be used for quantization in the second part. In other words, physical layer overhead may be reduced. To highlight the advantages of the two-part feedback, two examples are described next.

Example 1: it is assumed that the static range consumes 5 bits for feedback. In the two-part report, the client device 100 can report the range on a higher layer with a large period in the first part because it takes time for the power level to vary out of this range. It is further assumed that the reported range is ¼ of the static range, so that the client device 100 may only report the starting point of the range in the first part. Then, to guarantee the same granularity in quantization, the client device 100 may only need three bits to report the quantized value within the range in the second part by the physical layer signalling. Therefore, the overhead of the physical layer signalling may be reduced by 40% as long as the range can be considered unchanged, and the higher layer overhead can be ignored compared with existing higher layer signalling.

In the following example different ranges are considered.

The example above is generalized and given analytical bounds to assess the gain. In the following it is assumed that the set of static ranges for all the modes in the network is given in the set:

$$R = \{r_1, r_2, \ldots , r_K\} \tag{8}$$

in which K is the number of ranges for all the modes of operation, such that the range of the mode of i is denoted as $r_i$. The probability of having the range $r_i$ (i.e., the probability of having a mode i) is:

$$Pr(r = r_i) = p_i \tag{9}$$

for i=1, 2, . . . , K, such that:

$$\sum_{i=1}^{K} p_i = 1 \tag{10}$$

Without loss of generality, it is assumed that the length of the interval $r_i$ is larger than $r_{i-1}$. Therefore, the single-part feedback should be designed such that it includes the largest interval length of $r_K$, which wastes the resources when other modes of operation corresponding to smaller ranges become activated. It is further assumed that the largest range is normalized to one, and the remaining ranges are such that each is a half of the next one. If there is a range that is not a half of the largest one, the closet interval to that range is chosen. That is, the length of the interval $r_i$ will correspond to $2^{i-K}$. That is, if $b_K$ bits are needed to report the largest range, then to report range $r_i$, $b_i=i$ bits are needed to preserve the same quantization granularity. The average number of bits to report the value within the range then becomes:

$$E[b] = \sum_{i=1}^{K} p_i * b_i \tag{11}$$
$$= \sum_{i=1}^{K} p_i * i$$

If it is assumed that all modes of operation have equal probability, then the average number of bits will be simplified to:

$$E[b] = \sum_{i=1}^{K} \frac{1}{K} * i \tag{12}$$
$$= \frac{1}{K} \sum_{i=1}^{K} i$$
$$= \frac{1}{K} * \frac{K(K+1)}{2}$$
$$= \frac{K+1}{2}$$

That is, the two-part feedback may have an up to 50% overhead reduction as K increases. For example, when the single-part feedback uses 5 bits, the two-part feedback may only need 3 bits which corresponds to a 40% overhead reduction.

Another parameter is that of how often the static range varies. Even though it is referred to as static, it may still vary but much slower. It is assumed that its report is configured to span on average N times of that of the variation within a given range. To calculate the average number of bits for the disclosed embodiment where the first part is also reported over the physical layer, the average overhead may be:

$$E[b] = \frac{1}{N} \log(\text{Number of Modes}) + \sum_{i=1}^{K} \frac{1}{K} * i \tag{13}$$
$$= \frac{1}{N} \log(K) + \sum_{i=1}^{K} \frac{1}{K} * i$$
$$= \frac{1}{N} \log(K) + \frac{K+1}{2}$$

If the time length of the first part is set as 300 ms which is similar to the higher layer update, and the second part report is set to 40 ms which corresponds to SAR measurement updates at the client device 100 and to a five-bit report of the single-part feedback, the average bits obtained are:

$$E[b] = \frac{40}{300} \log(5) + \frac{5+1}{2} = 3.3 \tag{14}$$

which corresponds to a 34% overhead reduction.

In an implementation, the second part may be configured to be muted to further reduce the physical layer signal overhead, such that the report of all the information occurs in a higher layer. In this case, the client device 100 may effectively use a first part report of the two-part report. This may be applied, e.g., after the client device 100 connects to the network, so that the network node device 110 may get $\alpha_r$ which does not change for the client device 100.

The following table lists example modes for the disclosed two-part feedback that may be implemented for different client devices or different configurations of a given client device. It is noted that SAR regulations are not the same in different countries and hence different modes may be applied based on the regulations. For example, a periodic SAR signalling with faster report may be suitable for more stringent requirements.

TABLE 1

| Mode | Type of periodicity | Example Setup |
|---|---|---|
| Mode 1 | Part 1: periodic report<br>Part 2: periodic report | Part 1: 300-1000 ms periodicity<br>(Typical higher layer report period)<br>Part 2: 40 ms periodicity<br>(Typical SAR update at the UE) |
| Mode 2 | Part 1: semi-static report<br>Part 2: periodic report | Part 1: Once connected to network node device 110<br>Part 2: 40 ms periodicity<br>(Typical SAR update) |
| Mode 3 | Part 1: periodic report<br>Part 2: muted | Part 1: Part 1: 300-1000 ms periodicity<br>Part 2: muted<br>(Typical SAR variations are slow and ignored) |
| Mode 4 | Part 1: semi-static report<br>Part 2: muted | Part 1: Once connected to network node device 110<br>Part 2: muted<br>(Typical SAR and hardware variations are slowest) |

In an embodiment, the MSI-RS may be aperiodic or semi-persistent. When the MSI-RS is not activated, the client device 100 may send to the network node device 110 an MSI-RS request to ask for an MSI-RS transmission. Then, the network node device 110 may trigger the transmission of an aperiodic MSI-RS by, e.g., a downlink control indicator (DCI), or the network node device 110 may activate the semi-persistent MSI-RS by a medium access control control element (MAC-CE). The network node device 110 may also trigger aperiodic or semi-persistent reporting, e.g., in the following ways:

1. the network node device 110 may trigger an aperiodic first part report and an aperiodic second part report. In this case, the value may be reported in a single message;

2. the network node device 110 may trigger an aperiodic first part report and also activate a semi-persistent second part report. The transmission of the second part report may start after the first part report; or 3. the network node device 110 may trigger a semi-persistent first part and second part reports, which may have a different periodic within the activation time.

A benefit of this embodiment is that the overhead of the MSI-RS and the reporting may be reduced if the SAR operation does not change frequently.

If the first part and/or second part is transmitted in the physical layer, it may be transmitted along or together with other type(s) of uplink control information (UCI), e.g., an acknowledgement (ACK)/a negative acknowledgement (NACK), channel part information (CSI), a scheduling request (SR), a downlink resource index, in which the CSI may include at least one of a channel quality indicator (CQI), a precoding matrix indicator (PMI), a rank indicator (RI), a reference signal receive power (RSRP), a signal-to-interference-plus-noise ratio (SINR), and the downlink resource index may include a CSI-RS resource index, an MSI-RS resource index, or an SSB-index.

The client device 100 may drop some of the uplink control information bits. For example, if an allocated physical uplink control channel (PUCCH) resource is not enough to transmit all the needed UCI bits, the client device 100 may drop some of the bits.

In an embodiment, the client device 100 may drop UCI bits of low priority. Therefore, a predefined priority between the first part and/or the second part of the disclosure and other UCI types may be used. Examples include the following:

the first part and/or second part feedback bits may have a lower priority than an ACK/NACK;

the first part and/or second part feedback bits may have a higher priority than a CSI, or the first part and/or second part feedback bits may have a lower priority than a CSI;

the first part and/or second part feedback bits may have a lower priority than an SR; and/or the first part and/or second part feedback bits may have a higher priority than a downlink resource index, or the first part and/or second part feedback bits may have a lower priority than a downlink resource index.

The aperiodic/semi-static/periodic report of the first part and/or second part feedback on the physical layer may have a different priority with other UCI types (e.g., it may be aperiodic, semi-static or periodic).

Moreover, the network node device 110 may configure a report to the client device 100 to indicate that the report information includes the first part and/or second part feedback, and/or to indicate that the report information includes the first part and/or second part feedback as well as an MSI-RS resource index. For example, the MSI-RS resource index may correspond to the first part and/or second part feedback.

The client device 100 may be further configured to transmit a conventional UL SRS, by the help of which the network node device 110 may estimate the UL channel under mismatch, i.e., a channel vector which gives the mismatched DL channel. For example, at this point the client device 100 may have executed its SAR operation and hence there may be a mismatch between the UL and DL. The mismatched DL channel based on the UL measurement may be represented as:

$$H_{UL}^{T} = \begin{bmatrix} \bar{h}_1 \\ \bar{h}_2 \\ \vdots \\ \bar{h}_K \end{bmatrix} = \begin{bmatrix} \alpha_1 \beta_1 e^{j\theta_1} h_1 \\ \alpha_2 \beta_2 e^{j\theta_2} h_2 \\ \vdots \\ \alpha_K \beta_K e^{j\theta_M} h_K \end{bmatrix} \tag{15}$$

where $\bar{h}_i$ is the mismatched channel and $h_i$ is the actual DL channel. The parameters $\alpha_i$, $\beta_i \in (0,1]$, $\theta_i \in [-\pi,\pi]$ may be used to model the mismatch parameters at the client device 100. It is further assumed that the mismatch at the network node device 110 is normalized to one, and only the equivalent mismatch at the client device 100 is considered. Thus, the measured UL channel at the network node device 110 using the UL SRS may be written as:

$$\underset{\substack{\text{Mismatched } UL \\ \text{Channel}}}{H_{UL}} = \underset{\substack{\text{Parametrized Mismatch} \\ \text{Matrix}}}{\text{Diag}(\alpha_1 \beta_1 e^{j\theta_1}, \dots, \alpha_K \beta_K e^{j\theta_K})} \underset{\substack{\text{Actual } DL \\ \text{Channel}}}{H_{DL}} \tag{16}$$

From Eq. (13) the DL channel $H_{DL}$ may be written as:

$$H_{DL} = \text{Diag}(\alpha_1^{-1} \beta_1^{-1} e^{-j\theta_1}, \dots, \alpha_K^{-1} \beta_K^{-1} e^{-j\theta_K}) H_{UL} \tag{17}$$

Figure 1B:
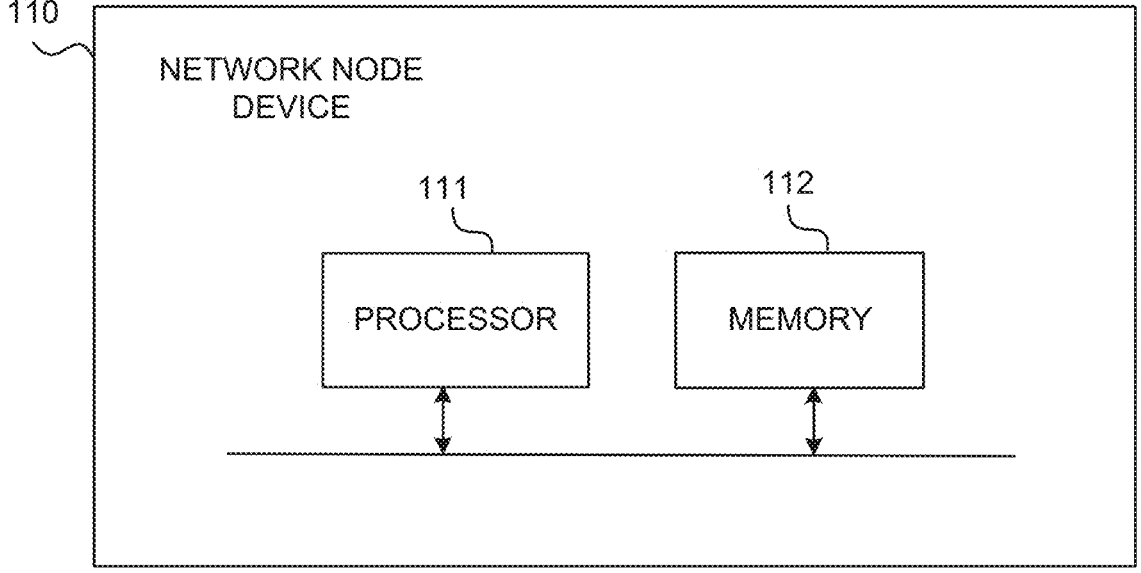
FIG. 1B is a block diagram illustrating a network node device.

Next, example embodiments of the network node device 110 are described based on FIG. 1B. Some of the features of the described devices are optional features which may provide further advantages.

FIG. 1B is a block diagram illustrating the network node device 110, according to an embodiment of the present disclosure. In an embodiment, the network node device 110 may comprise a base station. The base station may include, e.g., a fifth-generation base station (gNB) or any such device providing an air interface for client devices 100 to connect to a wireless network via wireless transmissions.

The network node device 110 may comprise at least one processor or a processing unit 111 and at least one memory 112 coupled to the at least one processor 111, which may be used to implement the functionalities described later in more detail.

The network node device 110 may also include other elements, such as a transceiver configured to enable the network node device 110 to transmit and/or receive information to/from other devices, as well as other elements not shown in FIG. 1B. In one example, the network node device 110 may use the transceiver to transmit or receive signalling information and data in accordance with at least one cellular communication protocol. The transceiver may be configured to provide at least one wireless radio connection, such as for example a 3GPP mobile broadband connection (e.g., 5G). The transceiver may comprise, or be configured to be coupled to, at least one antenna to transmit and/or receive radio frequency signals.

The at least one processor 111 may include, e.g., one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 112 may be configured to store e.g. computer programs and the like. The memory may include one or more volatile memory devices, one or more non-volatile memory devices, and/or a combination of one or more volatile memory devices and non-volatile memory devices. For example, the memory 112 may be embodied as semiconductor memories (such as mask ROM, PROM (programmable ROM), EPROM (erasable PROM), flash ROM, RAM (random access memory), etc.).

The network node device 110 is configured to receive the first part of feedback information from the client device 100 via a non-physical layer transmission or a physical layer transmission. As described above, the feedback information was determined by the client device 100 based on DL channel power for each receiving antenna of multiple receiving antennas 103 of the client device 100 from the DL pilot signal received by the client device 100.

The network node device 110 is further configured to receive the second part of the feedback information from the client device 100 via a physical layer transmission.

The network node device 110 is further configured to determine a correlation matrix for DL precoding at least partly based on the received first part of the feedback information and the received second part of the feedback information.

Diagram 500 of FIG. 5 illustrates an example of how an enhanced precoder may be generated based on the received feedback signal and the measured mismatched UL channel. Box 501 corresponds to box 207 of FIG. 2, box 502 corresponds to box 208 of FIG. 2, box 503 corresponds to box 206 of FIG. 2, box 504 corresponds to box 209 of FIG. 2, box 505 corresponds to box 210 of FIG. 2, box 506 corresponds to box 211 of FIG. 2, and box 507 corresponds to box 212 of FIG. 2.

One of the precoders that may be used in practice is based on the correlation matrix. Hence, the correlation matrix of the actual DL channel may be determined when the impact of the mismatch is accounted for by using the feedback signal and the measured UL channel via the reception of the UL SRS at the network node device 110. To determine a correct correlation matrix network node device 110 may need to know the actual DL channel which is $H_{DL}$. However, the matrix $H_{DL}$ may not be known, and only its mismatched version (i.e., $H_{UL}$) may be available at the network node device 110.

In the following, it is outlined how a correct DL correlation matrix may be determined. First, a sample correlation matrix may be written as:

$$R_{DL} \overset{def}{=} H_{DL}^{H} H_{DL} \qquad (18)$$

$$= H_{UL}^{H} \begin{bmatrix} \alpha_1^{-2}\beta_1^{-2} & 0 & \cdots & 0 \\ 0 & \alpha_2^{-2}\beta_2^{-2} & \ddots & \vdots \\ \vdots & \ddots & \ddots & 0 \\ 0 & \cdots & 0 & \alpha_K^{-2}\beta_K^{-2} \end{bmatrix} H_{UL}$$

$$= H_{UL}^{H} \mathrm{diag}(\alpha_1^{-2}\beta_1^{-2}, \ldots, \alpha_K^{-2}\beta_K^{-2}) H_{UL}$$

where the second equality follows from using Eq. (13a). The size of the matrix $H_{DL}$ in Eq. (18) is K×N, where N and K are the numbers of antennas at the network node device 110 and the client device 100, respectively. Thus, the size of the correlation matrix $R_{DL}$ is N×N. Now using this representation, the equality in Eq. (18) may be rewritten using only the received feedback signal and the measured UL channel found using the SRS according to:

$$R_{DL} = H_{UL}^{H} \mathrm{diag}\left( \frac{|h_{DL,1}|^2}{|h_{UL,1}|^2}, \ldots, \frac{|h_{DL,K}|^2}{|h_{UL,K}|^2} \right) H_{UL} \qquad (19)$$

$$= H_{UL}^{H} \mathrm{diag}\left( \frac{x_{FS,1}}{|h_{UL,1}|^2}, \ldots, \frac{x_{FS,K}}{|h_{UL,K}|^2} \right) H_{UL}$$

in which the last equality follows from the definition of the feedback signal based on the Euclidian norm.

Having found the correct correlation matrix, the network node device 110 may form the precoder based on the eigenvectors of the correlation matrix of operation 504. Let a singular value decomposition (SVD) of the correlation matrix be:

$$R_{DL} = [e_1, e_2, \ldots, e_K] \begin{bmatrix} \sigma_1 & 0 & \cdots & 0 \\ 0 & \sigma_2 & \ddots & \vdots \\ \vdots & \ddots & \ddots & 0 \\ 0 & \cdots & 0 & \sigma_K \end{bmatrix} [e_1, e_2, \ldots, e_K]^H \qquad (20)$$

where $e_i$, i=1, . . . , K are the eigenvectors with the size N×1, and $\sigma_i$, i=1, . . . , K are the corresponding eigenvalues which (without loss of generality) may be arranged in a descending order. If the rank of the downlink transmission is set to r(r≤K), the network node device 110 may form a precoder of size N×r by selecting the first r eigenvalues according to:

$$P_R = [e_1, e_2, \ldots, e_r] \tag{21}$$

This procedure is summarized in FIG. 5. It is noted that $x_{FS}$ may be generated using any suitable implementation of the quantizer.

When the scaling factor g is used, the correlation matrix can be modified as:

$$gR_{DL} = gH_{DL}^H H_{DL} = H_{UL}^H \text{diag}\left(g\frac{x_{FS,1}}{|h_{UL,1}|^2}, \ldots, g\frac{x_{FS,K}}{|h_{UL,K}|^2}\right) H_{UL} \tag{22}$$

$$gR_{DL} = gH_{DL}^H H_{DL} = H_{UL}^H \text{diag}\left(g\frac{x_{FS,1}}{|h_{UL,1}|^2}, \ldots, g\frac{x_{FS,K}}{|h_{UL,K}|^2}\right) H_{UL}$$

For a multi-user transmission, the difference of g between different client devices 100 may be estimated by letting the client device 100 report a reference signal received power (RSRP) measured based on the received MSI-RS (or its implementation, e.g., via a CSI-RS).

Further features of the network node device 110 directly result from the functionalities and parameters of the client device 100 and thus are not repeated here.

Figure 3:
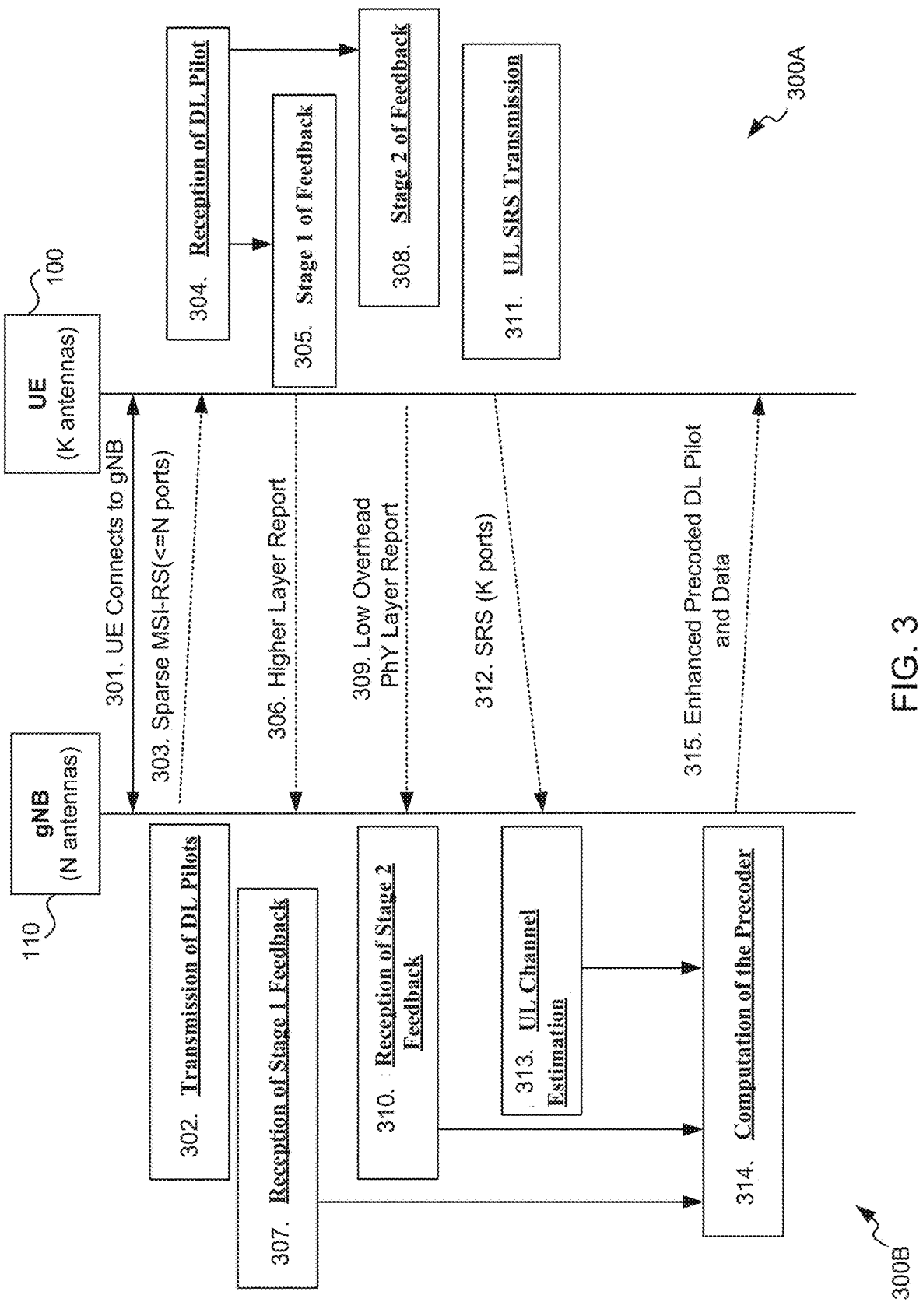
FIG. 3 is a signalling diagram illustrating a method.

FIG. 3 is a signalling diagram that illustrates methods 300A and 300B, according to an embodiment of the present disclosure.

At optional operation 301, the client device 100 may connect to the network node device 110.

At optional operations 302-303, the network node device 110 may transmit DL pilot signal(s) to the client device 100.

At operation 304, a DL pilot signal is received at the client device 100 from the network node device 110 via the multiple receiving antennas 103 of the client device 100. Further at operation 304, the client device 100 may perform channel estimation for each receiving antenna of the multiple receiving antennas 103 based on the received DL pilot signal, thereby obtaining a channel estimate for each receiving antenna of the multiple receiving antennas 103.

At operations 305 and 308, the client device 100 determines the feedback information based on DL channel power for each receiving antenna of the multiple receiving antennas 103 from the received DL pilot signal. Further at operations 305 and/or 308, the client device 100 may perform quantization on the determined feedback information.

At operation 306, the client device 100 transmits the first part of the feedback information to the network node device 110 via a non-physical layer transmission or a physical layer transmission.

At operation 307, the network node device 110 receives the first part of the feedback information via the non-physical layer transmission or the physical layer transmission.

At operation 309, the client device 100 transmits the second part of the feedback information to the network node device 110 via a physical layer transmission.

At operation 310, the network node device 110 receives the second part of the feedback information via the physical layer transmission.

At optional operations 311-312, the client device 100 may

At operations 313-314, the network node device 110 determines a correlation matrix for DL precoding at least partly based on the received first part of the feedback information and the received second part of the feedback information.

At optional operation 315, the network node device 110 may transmit enhanced precoded DL pilot signal(s) and/or data to the client device 100.

The methods 300A and 300B may be performed by the monitoring entity 220. The operations 301, 304-306, 308-309 and 311-312 can, for example, be performed by the at least one processor 101 and the memory 102. The operations 302-303, 307, 310 and 313-315 can, for example, be performed by the at least one processor 111 and the memory 112. Further features of the method 300A directly result from the functionalities and parameters of the client device 100 and thus are not repeated here. Further features of the method 300B directly result from the functionalities and parameters the network node device 110 and thus are not repeated here. The methods 300A and 300B can be performed by computer programs.

In the following, performance evaluations and benefits of the disclosed solutions are discussed.

The disclosure may solve the UL-DL mismatch problem with a very low feedback overhead, and may provide a notable throughput gain. Furthermore, the introduction of the first part does not have a practical impact on the duration of the UL information transfer, as it happens rarely.

To illustrate the gain, a DL transmission from a network node device with 64T64R antennas to a client device with 2T4R antennas is investigated. This means that N=64 and K=4 in the simulation. Moreover, the configuration of 2T4R antennas means that there are two RF transmission chains at the client device side, and the client device has to transmit the SRS twice to allow the network node device to estimate the uplink channel, i.e., the client device transmits the SRS on the first two of its four antennas at the first time and transmits the SRS on the remaining two of its four antennas at the second time. The mismatch factors are different for the first two antennas and the second two antennas. Thus, the mismatch factors for four antennas are modelled as k[1,1, $\alpha\beta e^{j\theta}, \alpha\beta e^{j\theta}$], where the parameter k is a common factor and k=1 is normalized in the simulation. The mismatched parameters are set to a 3 dB hardware mismatch and a 2~5 dB SAR mismatch. The transmission bandwidth is set to 4 PRB which corresponds to 1.44 MHz. It is assumed that the ratio between downlink and uplink is set to 4:1, which is a typical ratio in practical implementations of networks. The orthogonal frequency-division multiplexing (OFDM) subcarrier spacing is 30 kHz, so each slot is 0.5 ms according to NR standards.

A system without mismatch related reporting is considered to be a baseline. Two solutions are compared, i.e., the single-part reporting solution and the disclosed two-part reporting. The reported value is the quantized power ratio between the measured DL channels of the first two antennas and the remaining two antennas, i.e., $$x_{q,FS} = Q\left(\frac{|h_{i1}|^2 + |h_{i2}|^2}{|h_{i3}|^2 + |h_{i4}|^2}\right),$$

where the mapping Q(.) denotes a non-uniform quantization. For the single-part reporting solution, $x_{q,FS}$ is quantized with five bits and reported every 40 ms. For the two-part reporting, the center of the range, defined as $$\overline{x}_{q,FS} = Q\left(\frac{|h_{i1}|^2 + |h_{i2}|^2}{|h_{i3}|^2 + |h_{i4}|^2}\right),$$

is reported to the network node device 110 in the first part with ten-bit quantization through a higher layer signalling every second. The length of the range is predefined as ¼ of that of the single-part solution. Then, $$\tilde{x}_{q,FS} = Q\left(\frac{|h_{i1}|^2 + |h_{i2}|^2}{|h_{i3}|^2 + |h_{i4}|^2}\Big/\ \overline{x}_{q,FS}\right)$$

is reported to the network node device 110 in the second part with three-bit quantization through the physical layer every 40 ms. This periodicity report configuration corresponds to Mode 1 in Table 1.

The design of the quantization mapping Q is done as follows: a value α is first found, such that an interval $$I = \left[\frac{1}{a}\ a\right]$$

compromises 99% of the input argument (which is the power ratio in this case). Then, the interval is converted into decibels (i.e., 10 log(I)), and then divided into equal sub-intervals, where the number of the sub-intervals is $2^b$, where b is the number of the feedback bits of the first part.

Diagram 600 of FIG. 6 shows the averaged physical layer feedback overhead (bits/40 ms) of the single part feedback and the two-part feedback. It can be observed that the physical layer overhead may be reduced by 40% if the first part of two-part feedback is reported in a higher layer. Otherwise, the physical layer overhead may be reduced by 32% when both parts are performed over the physical layer. Thus, the disclosed two-part feedback may significantly reduce the overhead of physical layer signalling.

In different scenarios, the power range (i.e., the set of values of received (normalized) power) may vary. This means that the single-part feedback has to be designed for the worst-case power range, but for a worst-case design, more overhead is required. In addition to this overhead, in the single-part feedback design the reports of quantization boundaries are ignored, such that the single-part feedback only reports few bits of the associated quantization interval. Thus, the two-part feedback solves two issues: it reports the boundaries and then makes the report more adaptive to communication scenarios, thereby providing a lower overhead and a more scalable solution for larger numbers of antennas at the client device 100.

If the first part of the two-part feedback is reported in a higher layer, it may be transmitted together with uplink data. According to the ratio between downlink and uplink (4:1), there is one uplink transmission opportunity in every five slots, i.e., in every 2.5 ms since one slot is 0.5 ms. Compared with the one-second period of first part of the feedback, only 2.5% of the uplink transmission may be impacted. Moreover, even in the same slot, the number of the first part feedback bits (10 bits) is relatively small compared to the uplink transmission bits. For example, it may be assumed that the uplink bits are coded with a code rate 0.5 and modulated by 16-QAM (quadrature amplitude modulation). The transmitted uplink bits may thus be calculated as:

(4 *PRB*) * (12 subcarriers per *PRB*) *

(14 *OFDM* symbols in one slot − 2 *DMRS OFDM* symbols) *

(0.5 code rate) * (4 modulation order) = 1152 bits

Thus, the first part feedback bits are less than 1% of the uplink transmission bits. Consequently, the introduction of the first part does not have a practical impact on the duration of the UL information transfer.

Diagram 700 of FIG. 7 has been calculated by looking at the effective rate for various NR modulation and coding scheme (MCS) tables at a block error rate (BLER) of 10%. More specifically, Diagram 700 of FIG. 7 shows an achievable rate of the disclosed two-part feedback using the MSC table of NR at a 10% BLER with a low-density parity-check (LDPC)-coded transmission with two data streams for the network node device 110 with 64T64R antennas and the client device 100 with 2T4R antennas for no feedback in NR and for the disclosed two-part feedback with digital feedback of five bits. It can be seen that both the single-part feedback and the two-part feedback may achieve up to 14% throughput gain in this setup. However, the two-part feedback performs almost the same as the single-part feedback with a much lower overhead.

A conclusion from FIG. 6 and FIG. 7 is that the disclosed two-part feedback may achieve a 32%~40% feedback overhead reduction with almost no performance loss compared to the single-part feedback, and the disclosed two-part feedback may outperform previous NR solutions up to 14% in the throughput.

The functionality described herein can be performed, at least in part, by one or more computer program product components such as software components. According to an embodiment, the client device 100 and/or network node device 110 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A client device comprising multiple receiving antennas, a processor and a memory having computer-executable instructions stored thereon which upon execution by the processor cause the client device to:

receive a downlink (DL) pilot signal from a network node device via the multiple receiving antennas;

determine feedback information based on DL channel power for each receiving antenna of the multiple receiving antennas from the received DL pilot signal;

transmit a first part of the feedback information to the network node device via a non-physical layer transmission or a physical layer transmission; and transmit a second part of the feedback information to the network node device via the physical layer transmission.

2. The client device according to claim 1, wherein the feedback information has a quantization range, and the first part of the feedback information comprises an indication of the quantization range.

3. The client device according to claim 2, wherein the indication of the quantization range comprises at least one of a starting value of the quantization range, an ending value of the quantization range, a center value of the quantization range, or a length of the quantization range.

4. The client device according to claim 2, wherein the second part of the feedback information comprises an indication of quantized values of the DL channel power for each receiving antenna of the multiple receiving antennas within the quantization range.

5. The client device according to claim 3, wherein the second part of the feedback information comprises an indication of quantized values of the DL channel power for each receiving antenna of the multiple receiving antennas within the quantization range.

6. The client device according to claim 5, wherein the quantized values of the DL channel power for each receiving antenna of the multiple receiving antennas comprise relative values that are relative to at least one of the starting value of the quantization range, the ending value of the quantization range, or the center value of the quantization range.

7. The client device according to claim 5, wherein quantized values of the DL channel power for each receiving antenna of the multiple receiving antennas comprise differential values that indicate a difference to at least one of the starting value of the quantization range, the ending value of the quantization range, or the center value of the quantization range.

8. The client device according to claim 1, further configured to transmit the first part of the feedback information periodically, aperiodically, semi-persistently or semi-statically, and to transmit the second part of the feedback information periodically, aperiodically, semi-persistently, or mutedly.

9. The client device according to claim 1, wherein the received DL pilot signal comprises a mismatch state information reference signal (MSI-RS), a channel state information reference signal (CSI-RS), or a synchronization signal block (SSB).

10. The client device according to claim 1, wherein the client device comprises a time-division duplex (TDD) capable client device.

11. The client device according to claim 1, wherein the client device comprises a multiple-input and multiple-output (MIMO) capable client device.

12. A method, comprising:

receiving, at a client device comprising multiple receiving antennas, a downlink (DL) pilot signal from a network node device via the multiple receiving antennas;

determining, by the client device, feedback information based on DL channel power for each receiving antenna of the multiple receiving antennas from the received DL pilot signal;

transmitting, by the client device, a first part of the feedback information to the network node device via a non-physical layer transmission or a physical layer transmission; and transmitting, by the client device, a second part of the feedback information to the network node device via the physical layer transmission.

13. A non-transitory computer readable medium comprising program code which upon being run by a computer causes the computer to perform a method according to claim 12.

14. The method according to claim 12, wherein the feedback information has a quantization range, and the first part of the feedback information comprises an indication of the quantization range.

15. The method according to claim 14, wherein the indication of the quantization range comprises at least one of a starting value of the quantization range, an ending value of the quantization range, a center value of the quantization range, or a length of the quantization range.

16. The method according to claim 14, wherein the second part of the feedback information comprises an indication of quantized values of the DL channel power for each receiving antenna of the multiple receiving antennas within the quantization range.

17. The method according to claim 15, wherein the second part of the feedback information comprises an indication of quantized values of the DL channel power for each receiving antenna of the multiple receiving antennas within the quantization range.

18. The method according to claim 17, wherein the quantized values of the DL channel power for each receiving antenna of the multiple receiving antennas comprise relative values that are relative to at least one of the starting value of the quantization range, the ending value of the quantization range, or the center value of the quantization range.

19. A network node device, comprising:

a processor and a memory having computer-executable instructions stored thereon which upon execution by the processor cause the network node device to:

receive a first part of feedback information from a client device via a non-physical layer transmission or a physical layer transmission, the feedback information determined by the client device based on downlink (DL) channel power for each receiving antenna of multiple receiving antennas of the client device from a DL pilot signal received by the client device;

receive a second part of the feedback information from the client device via the physical layer transmission; and determine a correlation matrix for DL precoding at least partly based on the received first part of the feedback information and the received second part of the feedback information.

20. The network node device according to claim 19, wherein the feedback information has a quantization range, and the first part of the feedback information comprises an indication of the quantization range.

* * * * *